US008839079B2

(12) United States Patent
Chen et al.

(10) Patent No.: US 8,839,079 B2
(45) Date of Patent: Sep. 16, 2014

(54) METHODS AND APPARATUSES FOR SAVING POWER DURING TRANSPORT BLOCK DECODING IN UMTS SYSTEMS

(75) Inventors: Jinghu Chen, San Diego, CA (US); Wanlun Zhao, San Diego, CA (US); Michael Mingxi Fan, San Diego, CA (US); Fuyun Ling, San Diego, CA (US); Peter John Black, San Diego, CA (US); Krishna Kiran Mukkavilli, San Diego, CA (US); Weihong Jing, San Diego, CA (US); Jia Tang, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 13/589,651

(22) Filed: Aug. 20, 2012

(65) Prior Publication Data

US 2014/0053049 A1  Feb. 20, 2014

(51) Int. Cl.
*H03M 13/00* (2006.01)
*H04L 1/00* (2006.01)

(52) U.S. Cl.
CPC .............. *H04L 1/0051* (2013.01); *H04L 1/0053* (2013.01)
USPC .......................................... 714/780; 714/807

(58) Field of Classification Search
CPC . H04L 1/051; H04L 1/0053; H03M 13/2951; H03M 13/2975; H03M 13/3753; H03M 13/45; H03M 13/2963; H03M 13/2957
USPC .......................................... 714/780, 807, 789
See application file for complete search history.

(56) References Cited

U.S. PATENT DOCUMENTS 6,888,901 B2 * 5/2005 Yu et al. ..................... 375/341
6,898,254 B2 * 5/2005 Wolf et al. ................. 375/340

(Continued)

FOREIGN PATENT DOCUMENTS

EP   1748592 A2   1/2007
EP   2224632 A1   9/2010
EP   2224633 A1   9/2010

OTHER PUBLICATIONS

Mukumoto K., et al., "Proposal of Go-Back-i-symbol ARQ Scheme and its Performance Evaluation in Meteor Burst Communications", IEEE Transactions on Communications, IEEE Service Center, Piscataway, NJ. USA, vol. 60, No. 8, Aug. 1, 2012, pp. 2336-2343, XP011456646, ISSN: 0090-6778, DOI: 10.1109/ TCOMM.2012.071912.110330 Section A; page.*
Torrea-Duran, "Adaptive Early-Stopping Threshold for LTE Turbo Decoder," 18th European Signal Processing Conference (EUSIPCO-2010) Aalborg, Denmark, Aug. 23-27, 2010, pp. 1384-1388.

(Continued)

*Primary Examiner* — John Trimmings
(74) *Attorney, Agent, or Firm* — Charles Chesney

(57) ABSTRACT

The present disclosure describes methods and apparatuses for improved transport block decoding in devices capable of wireless communication, which may include user equipment and network entities. For example, the present disclosure presents methods and apparatuses for decoding a code block from a plurality of code blocks corresponding to a transport block, obtaining a reliability indicator that identifies a reliability of the decoding of the code block, comparing the reliability indicator to a reliability threshold, and determining whether to decode a subsequent code block from the plurality of code blocks based on the comparing. Furthermore, these methods and apparatuses may include determining not to decode at least one subsequent code block of the transport block where the comparing indicates that the reliability indicator is less than the reliability threshold. As such, device power is not unnecessarily consumed by decoding likely superfluous code blocks.

40 Claims, 11 Drawing Sheets

(56) References Cited

U.S. PATENT DOCUMENTS

| | | | |
|---|---|---|---|
| 2007/0038922 A1* | 2/2007 | Kim et al. | 714/776 |
| 2007/0124657 A1* | 5/2007 | Orio | 714/794 |
| 2009/0106635 A1 | 4/2009 | Kim et al. | |
| 2009/0132893 A1* | 5/2009 | Miyazaki et al. | 714/776 |
| 2010/0223534 A1 | 9/2010 | Earnshaw et al. | |
| 2013/0007571 A1* | 1/2013 | Li et al. | 714/795 |
| 2013/0013976 A1* | 1/2013 | Earnshaw et al. | 714/758 |
| 2013/0061118 A1* | 3/2013 | Pi et al. | 714/807 |
| 2013/0311858 A1* | 11/2013 | Ramesh et al. | 714/807 |

OTHER PUBLICATIONS

International Search Report and Written Opinion—PCT/US2013/055210—ISA/EPO—Mar. 14, 2014.

Mukumoto K., et al., "Proposal of Go-Back-i-symbol ARQ Scheme and its Performance Evaluation in Meteor Burst Communications", IEEE Transactions on Communications, IEEE Service Center, Piscataway, NJ. USA, vol . 60, No. 8, Aug. 1, 2012, pp. 2336-2343, XP011456646, ISSN: 0090-6778, DOI: 10.1109/TCOMM.2012.071912.110330 Section A; p. 2.

* cited by examiner

METHODS AND APPARATUSES FOR SAVING POWER DURING TRANSPORT BLOCK DECODING IN UMTS SYSTEMS

BACKGROUND

1. Field

Aspects of the present disclosure relate generally to wireless communication systems, and more particularly, to decoding methods and apparatuses in wireless communication devices.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division—Code Division Multiple Access (TD-CDMA), and Time Division—Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. As the demand for mobile broadband access continues to increase, research and development continue to advance the UMTS technologies not only to meet the growing demand for mobile broadband access, but to advance and enhance the user experience with mobile communications.

Furthermore, in UMTS networks, wireless devices, or "user equipment" (UE), communicate with the network by transmitting information to, and receiving information from, UMTS network devices. Specifically, this information is organized into at least one transport block (TB) at the transmitting device, and the transport blocks are then separated into at least one code block (CB) for transmission. Each of these code blocks are separately turbo encoded and all turbo-encoded code blocks are transmitted to the receiving device—be it a UE or a network entity—in one subframe.

Upon receipt of the CBs, the receiving device places each of the code blocks into a receiver queue and decodes each of the code blocks that comprise the transport block individually. However, each of the code blocks do not contain cyclic redundancy check (CRC) information corresponding to the code block itself or the transport block of which it is a part. Instead, the CRC information is typically appended to one (or only a few) of the code blocks of a transport block. Thus, in legacy systems, to decode a full transport block with multiple code blocks and perform a CRC to ensure that the transport block has been successfully received, the receiving device must implement a brute-force approach to decoding and CRC procedures. This brute force implementation may require that a turbo decoder at the receiver decode each of the code blocks in the transport block multiple times (also referred to as "at full iterations"), such as, for example, during one or more decoding iterations that may occur at one or more of a first transmission of the transport block and any possible retransmission of the transport block.

Thereafter, once all the code blocks have been decoded, a CRC on the entire transport block may be performed to determine whether the entire transport block was correctly received. Such a procedure, however, consumes unnecessary time and energy because if one decoded code block contains any incorrect bits, the entire transport block will fail the CRC even if all of the other decoded code blocks of the transport block are correct.

Thus, methods and apparatuses for efficient transport and code block decoding at a receiving wireless device are needed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides methods and apparatuses for improved transport block decoding in devices capable of wireless communication, such as user equipment and network devices. In one aspect, the disclosure presents a method of decoding, which includes decoding a code block from a plurality of code blocks corresponding to a transport block, obtaining a reliability indicator that identifies a reliability of the decoding of the code block, comparing the reliability indicator to a reliability threshold, and determining whether to decode a subsequent code block from the plurality of code blocks based on the comparing.

According to another aspect, the present disclosure describes an apparatus for decoding a wireless communication, which includes means for decoding a code block from a plurality of code blocks corresponding to a transport block, means for obtaining a reliability indicator that identifies a reliability of the decoding of the code block, means for comparing the reliability indicator to a reliability threshold, and means for determining whether to decode a subsequent code block from the plurality of code blocks based on the comparing.

In a further aspect, the present disclosure teaches a computer-readable medium comprising code for: decoding a code block from a plurality of code blocks corresponding to a transport block, obtaining a reliability indicator that identifies a reliability of the decoding of the code block, comparing the reliability indicator to a reliability threshold, and determining whether to decode a subsequent code block from the plurality of code blocks based on the comparing.

Furthermore, the present disclosure describes an apparatus for wireless communication, which includes at least one processor and a memory coupled to the at least one processor. In addition, the at least one processor is configured to decode a code block from a plurality of code blocks corresponding to a transport block, obtain a reliability indicator that identifies a reliability of the decoding of the code block, compare the reliability indicator to a reliability threshold, and determine whether to decode a subsequent code block from the plurality of code blocks based on the comparing.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents. These and other aspects of the invention will become more fully understood upon a review of the detailed description, which follows.

DETAILED DESCRIPTION

Figure 1:
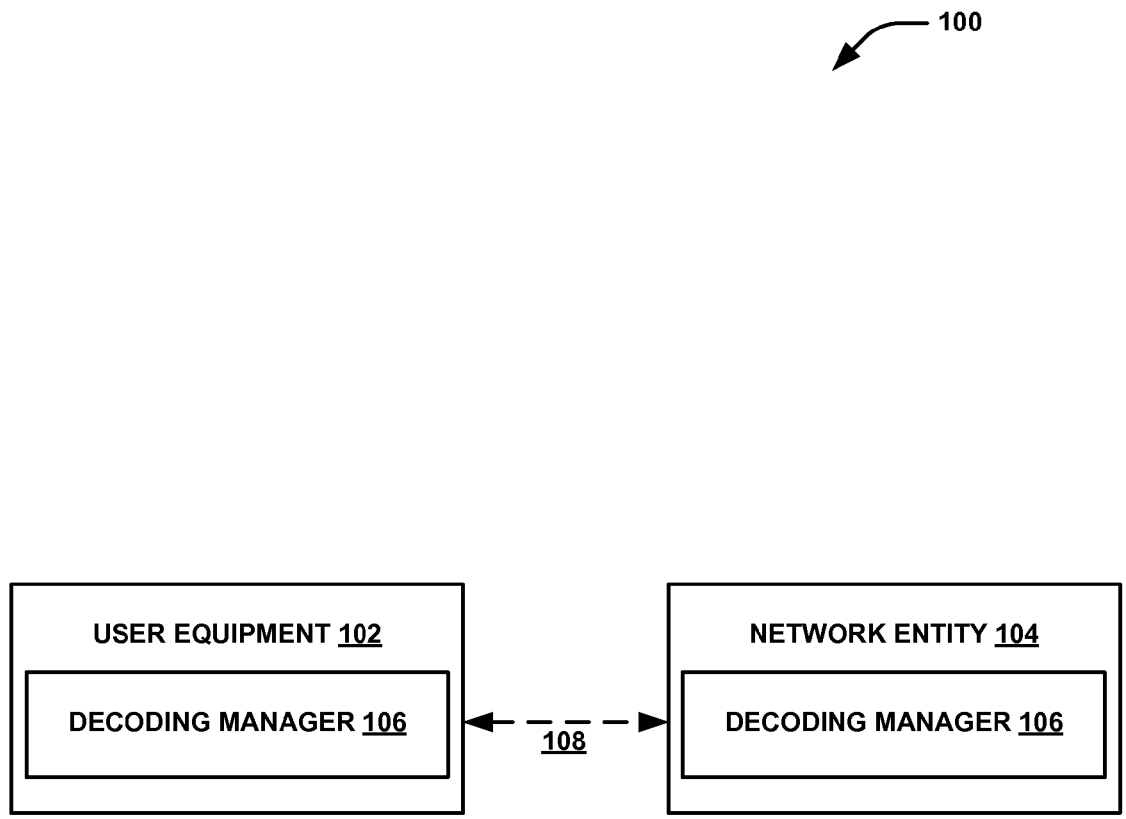
FIG. 1 is an example system-level diagram illustrating a wireless system that provides wireless communication between a user equipment and a network entity, which may each serve as transmitting and receiving devices.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

According to aspects of the present disclosure, a receiving device may generate a metric during the decoding of each code block. The device may utilize this metric to determine whether to decode subsequent CBs, and/or which subsequent CBs, of the same transport blocks should be decoded. For example, in one aspect, the receiving device may obtain the minimum absolute value of the log-likelihood ratio (Min_LLR) of each information bit returned during the decoding of a code block. This Min_LLR value may indicate the reliability of the code block decoding, and may be defined as the minimum absolute value of the ratio of the probability that a code block bit will be decoded as value 1 to the probability that the code block bit will be decoded as value 0. In an aspect, where the Min_LLR value is very large, it is very likely the current code block is correctly decoded. Conversely, where the Min_LLR value is small, the decoding may not be so reliable.

In an additional aspect, where the max number of decoding iterations is reached for a single CB, if the Min_LLR value returned by the decoder is less than or equal to a reliability threshold, the receiving device may assume that the code block has been incorrectly received from a transmitting device. In such an instance, the receiving device may skip the decoding of the remaining code blocks of the same transport block and/or decode subsequent code blocks of the transport block at a reduced number of iterations. Such example operation according to the present disclosure may result in significant power savings where a received transport block has more than one code block because power is not unnecessarily consumed in decoding the remaining code blocks.

Furthermore, the reduction in power may be exacerbated by the fact that channel conditions are highly correlated in one sub-frame—thus, where a code block early in a transport block fails to be correctly decoded, it may be likely that the other code blocks of the same transport block will also fail to correctly decode. It follows that power may be saved by skipping the decoding of subsequent code blocks of a transport block after unsuccessful decoding of an early code block because these subsequent code blocks are likely to fail as well. In addition, where a code block is unsuccessfully decoded initially, an unsuccessful subsequent code block decoding may require many decoding iterations—thereby further increasing the unneeded power loss compared to where decoding of that subsequent code block is skipped. In addition, the error rate in code block decoding of the first transmission of a transport block can be as high as 60% or higher in a practical UMTS systems. Thus, skipping decoding of code blocks that follow an unsuccessfully decoded code block in a first transmission can further reduce unnecessary power consumption.

FIG. 1 illustrates an example wireless system 100 that enables wireless communication between one or more user equipment 102 and one or more network entities 104. In an aspect, user equipment 102 and network entity 104 may communicate via a communication link 108, which may be an over-the-air link. In a further aspect of the present disclosure, user equipment 102 and/or network entity 104 may contain a decoding manager 106, which may be configured to decode at least one code block of the transport block, obtain a reliability indicator associated with the CB, and determine whether to decode subsequent code blocks of the transport block based on at least the reliability indicator.

Furthermore, for purposes of the present disclosure, examples of user equipment 102 may include, but are not limited to, a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The user equipment 102 is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Additionally, network entity 104 may include a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), a radio network controller (RNC) or some other suitable terminology.

In an aspect, user equipment 102 and network entity 104 may communicate by transmitting and/or receiving one or more data packets to or from the other device. In an aspect, each of such packets may be split into at least one transport block (TB), which may be further broken down into at least one code block (CB). In an aspect, these code blocks may be received by a receiving device (e.g., user equipment 102 or network entity 104), which may decode the received code blocks at decoding manager 106.

Figure 2:
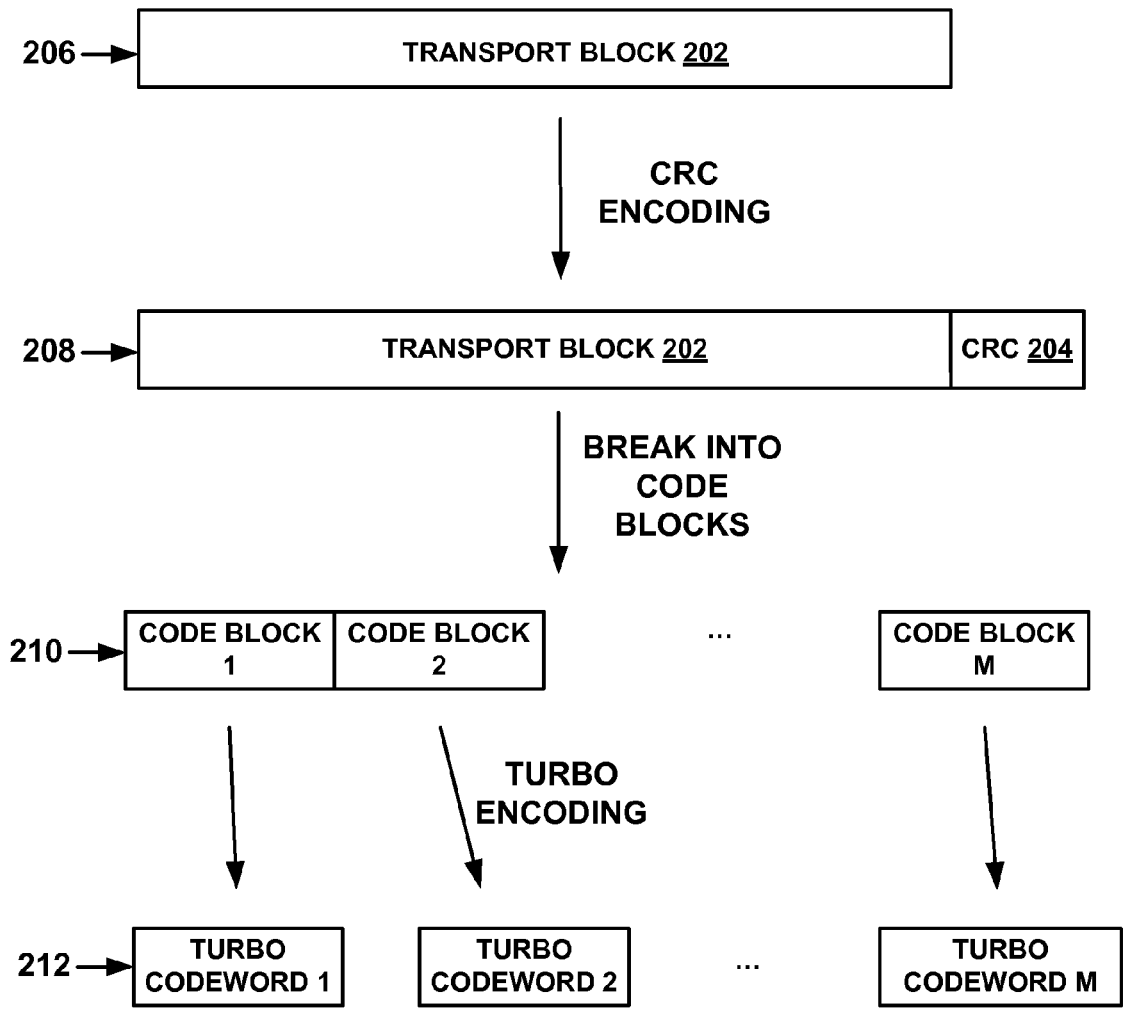
FIG. 2 illustrates the structure of example transport blocks and code blocks and an example method of encoding one or more code blocks of a transport block.

In a further aspect, user equipment 102 and/or network entity may be configured to encode transport blocks for transmission to a receiving device. FIG. 2 illustrates a non-limiting example structure of a transport block and its encoding. For example, at stage 206, the transport block may be a unitary block of bits carrying information to be transmitted by a transmitting device. In an aspect, the transport block 202 may undergo cyclic redundancy check (CRC) encoding, wherein an encoding component of the transmitting device may append one or more CRC bits 204 to transport block 202 at stage 208. These CRC bits may serve as an error detection mechanism at the receiving device. For example, the CRC bits (or any other type of error-detection information) may be received and decoded at the receiving device and can help the receiving device to determine whether the data in the transport block 202 has been correctly received.

Next, the transmitting device may break the transport block-CRC of stage 208 into code blocks at stage 210. In an aspect, these code blocks may comprise M code blocks and may therefore include code block 1 to code block M. Furthermore, each code block may undergo turbo encoding, for example, by a turbo encoder to form separate turbo codewords at stage 212. Thereafter, in an aspect, each of these turbo codewords of stage 212 may be transmitted, for example, in a single subframe, to the receiving device.

Figure 3:
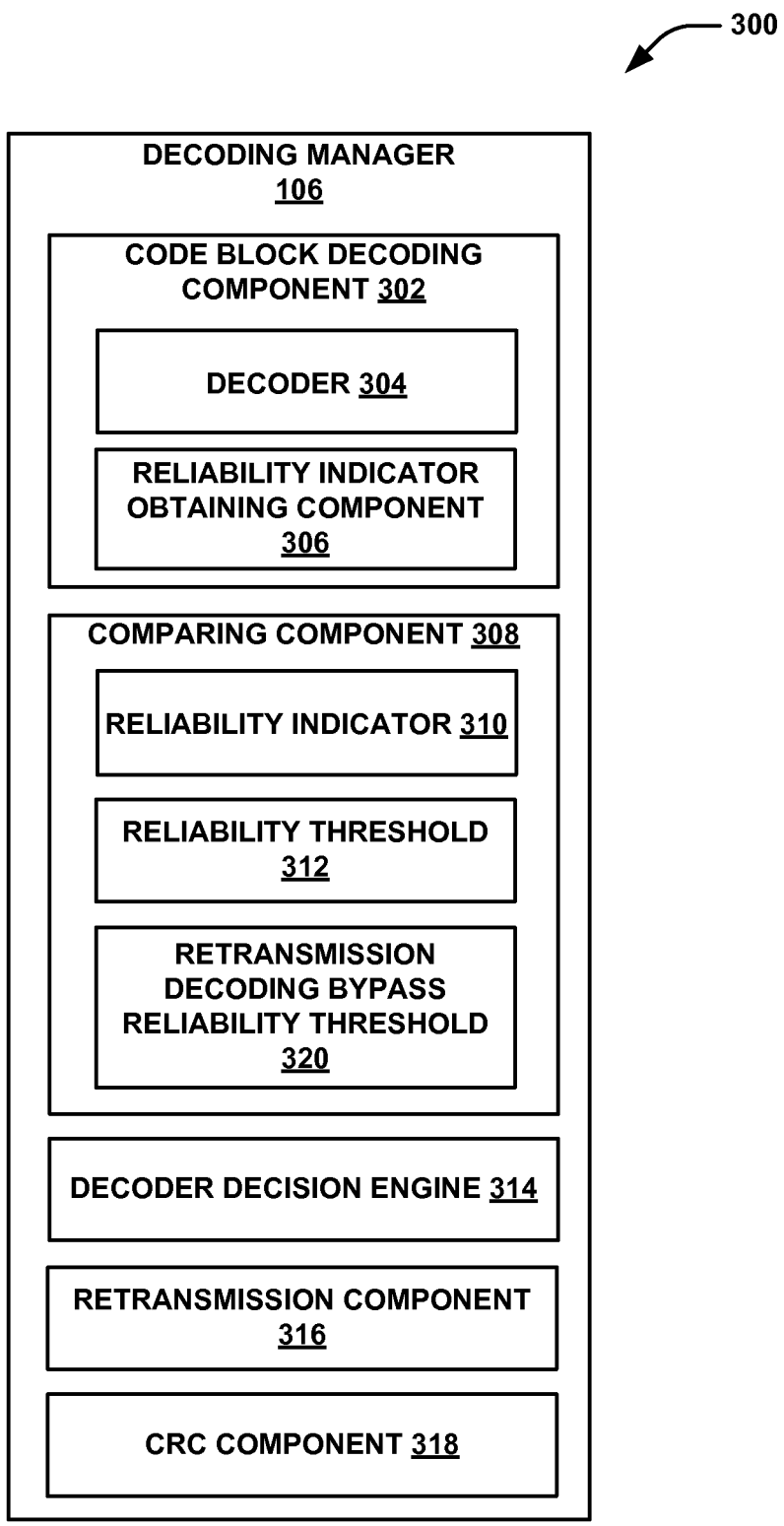
FIG. 3 is a block diagram illustrating components of an example decoding manager component of the present disclosure.

FIG. 3 illustrates a block diagram 300 of an exemplary decoding manager 106, in accordance with an embodiment of the present disclosure. In an aspect, decoding manager 106 may be decoding manager 106 of FIG. 1, and may be configured to manage the decoding of received code blocks in one or more devices in a wireless network, such as a user equipment 102 or a network entity 104 (FIG. 1). As illustrated, decoding manager may include a code block decoding component 302, which may be configured to read and decode one or more received code blocks and obtain a reliability indicator associated with all or a part of each code block. For example, code block decoding component 302 may include a decoder 304, which may comprise a turbo decoder. In some examples, decoder 304 may be configured to read one or more received code blocks from a receiver queue or other storage component and decode the data from its encoded form, as received, into one or more information bits. Additionally, decoder 304 may communicate these one or more information bits to one or more other components of decoding manager 106.

Furthermore, code block decoding component 302 may include a reliability indicator obtaining component 306, which may be configured to obtain a reliability indicator associated with a code block. In an aspect, reliability indicator obtaining component 306 may obtain the reliability indicator 310 by generating the reliability indicator 310, while in another aspect, reliability indicator obtaining component 306 may obtain the reliability indicator 310 by receiving it from an external component or memory.

In an aspect, the reliability indicator 310 may be, or may be derived from, a minimum absolute value of the logarithm-likelihood ratio (Min_LLR) of each information bit resulting from the decoding of a code block by decoder 304. According to an aspect, the Min_LLR may be computed by the reliability indicator obtaining component 306 and may indicate a level of reliability of the code block decoding. The logarithm-likelihood ratio (LLR) represents the logarithm of the ratio of the probability that a given bit d in a code block stream will be interpreted as 1 by a decoder 304 to the probability that d will be interpreted as 0 by the decoder. The Min_LLR may therefore be computed by the reliability indicator by computing the LLR of each decoded code block bit in a decoding iteration (or a plurality of decoding iterations), and then setting the Min_LLR as the absolute value of the minimum value of these computed LLRs. Additionally, where the Min_LLR is large, it may be likely that the subject code block was correctly decoded by decoder 304. Alternatively, where the Min_LLR is small, the decoding may not be reliable. In one example, where Min_LLR has a zero value, the decoded code block may contain bits equally probable to be zero or one.

As further illustrated, decoding manager 106 may include a comparing component 308, which may be configured to compare reliability indicator 310 (e.g., Min_LLR) to a reliability threshold 312. In an aspect, reliability threshold 312 may be pre-determined and stored in the UE and/or network entity by a designer, manufacturer, user, network administrator, or the like, or may be dynamically set and/or updated according to one or more network conditions (e.g., loading and/or channel conditions).

Furthermore, comparing component 308 may output the result of the comparison to one or more other components of decoding manager 106, such as, but not limited to decoder decision engine 314. In an aspect, decoder decision engine 314 may be configured to determine, based on at least the result of the comparison of reliability indicator 310 and reliability threshold 312, whether to decode one or more subsequent received code blocks of the transport blocks and/or whether to alter a number of decoding iterations associated with a current or future code block. In a related aspect, where subsequent code block decoding is permitted to continue, decoder decision engine 314 may determine the next code block to be decoded and/or the altered number of decoding iterations to be applied to a current code block or subsequent transport block. Alternatively, decoder decision engine 314 may be configured to determine whether transport block retransmission is permitted—and where retransmission is permitted, may be configured to command a retransmission component 316 of decoding manager 106 to transmit a retransmission request to the transmitting device.

As a non-limiting example of decoder decision engine 314 operation, after a maximum number of decoding iterations has been reached in decoding a current CB, if comparing component 308 determines that a Min_LLR value (or the value of another reliability indicator 310 metric) of the code block is less than the reliability threshold, decoder decision engine 314 may determine that there is a low probability that the code block has been correctly decoded. Based on this determination, decoder decision engine 314 may command the code block decoding component 302 to skip the decoding of any subsequent received code blocks of the transport block. In other words, where the current decoded code block is $CB_n$ of M code blocks in the transport block, the decoder decision engine 314 may apply the decision associated with $CB_n$ to $CB_{n+1}$-$CB_M$. In this non-limiting aspect, therefore, before $CB_{n+1}$-$CB_M$ have been decoded, decoder decision engine 314 may determine that each of $CB_{n+1}$-$CB_M$ were likely incorrectly received and may therefore command code block decoding component 302 to skip the decoding of $CB_{n+1}$-$CB_M$.

In a related aspect, where the current code block is the first decoded code block ($CB_1$) of a received transport block and the comparing component 308 has determined that the reliability indicator 310 is less than reliability threshold 312, decoder decision engine 314 may apply this comparison result to $CB_2$ to $CB_M$. Thus, in this non-limiting aspect, decoder decision engine 314 may determine that $CB_1$ was incorrectly received based on the result of the comparison of comparing component 308. Because it is likely that $CB_1$ was received in error, it is also likely that the CRC 204 of the transport block 202 will fail. This failure of CRC check in an embodiment may result in the transport block being resent and/or discarded regardless of whether the other codeblocks (e.g., $CB_2$ to $CB_M$) were likely correctly received. Thus, in an aspect, if decoder decision engine 314 determines that a codeblock (e.g., $CB_1$) was incorrectly received, decoder decision engine may command code block decoding component 302 to skip the decoding of subsequent codeblocks (e.g., $CB_2$ to $CB_M$) for the transport block.

In an additional aspect, certain hardware, scheduling, or algorithmic constraints may not permit decoder decision engine 314 to apply a decision associated with a current code block to a next-in-queue code block. Instead, in such an aspect, the decision associated with the current code block may be instead applied to later code blocks after the next-in-queue code block. In other words, where a current code block is $CB_n$, the next-in-queue code block is $CB_{n+1}$, and the later code blocks after the next-in-queue code blocks may be any or all of $CB_{n+2}$-$CB_M$. Therefore, according to the present non-limiting aspect, decoder decision engine 314 may apply the decision associated with $CB_n$ resulting from comparison of comparing component 308 to $CB_{n+2}$-$CB_M$.

Specifically, in a related non-limiting situation where a current code block is $CB_1$ and decoder decision engine 314 determines that $CB_1$ was likely incorrectly received and/or decoded based on the comparison of comparing component 308. In such a situation, according to an aspect, decoder decision engine 314 may not apply the decision associated with $CB_1$ to the next-in-queue code block—namely, $CB_2$. Instead, decoder decision engine 314 may instead apply the decision associated with $CB_1$ to $CB_3$-$CB_M$ and therefore command code block decoding component 302 to skip the decoding of $CB_3$-$CB_M$. Additionally, as a result, decoder decision engine 314 may command retransmission component 316 to transmit a retransmission request to the transmitting device for retransmission of the subject transport block.

In an additional aspect, where retransmission component 316 transmits a request for retransmission of the subject transport block, upon receiving the retransmitted transport block, decoding manager 106 may be configured to skip the decoding of any code blocks that had been deemed likely successfully received and decoded during a previous decoding iteration in a previous transmission or retransmission. In other words, where the reliability indicator 310 (e.g., Min_LLR) associated with a code block was very high during the previous decoding iteration, decoding manager 106 could be relatively confident that the code block was previously correctly received and decoded even though the CRC may have failed for the transport block due to errors or low reliability indicators associated with other code blocks in the previous decoding iteration. Therefore, where decoder decision engine 314 commands retransmission component 316 to request retransmission of a transport block, it may also indicate to an external component, such as processor 402 of FIG. 4, to store (e.g., in memory 404 of FIG. 4) the decoded information associated with any code blocks whose reliability indicator 310 exceeded a retransmission decoding bypass reliability threshold 320, which may have a value greater than (or, alternatively, less than or equal to) the reliability threshold 312.

For example, according to a non-limiting scenario, assume that a sample transport block contains twelve code blocks (M=12). Further, assume that during a previous decoding iteration, decoding manager 106 through decoder decision engine 314 determined that $CB_1$-$CB_7$ were likely correctly received and decoded (e.g., the reliability indicators associated with $CB_1$-$CB_7$ were greater than retransmission decoding bypass reliability threshold 320). As a result, decoding manager 106 saved the decoded information of $CB_1$-$CB_7$ into memory. However, when decoding manager 106 attempted to decode $CB_8$, decoder decision engine 314 determined that $CB_8$ was likely received incorrectly and therefore commanded decoder 304 to skip the decoding of $CB_9$-$CB_{12}$ and for retransmission component 316 to request retransmission of the transport block by the transmitting device. According to the present aspect, therefore, a component of decoding manager 106 (e.g., retransmission component 316, decoder decision engine 314, or another component, shown or not shown) may command decoder 304 to begin decoding the retransmitted transport block at $CB_8$. As such, further power and time may be saved in attempting to decode the transport block upon retransmission.

Furthermore, decoder decision engine 314 may be configured, rather than cancel the decoding or the remaining code blocks of a received transport block, to alter a number of decoding iterations associated with a current code block or subsequent code block in the receiver or decoding queue. In an aspect, such decoding iteration alteration may be preferred over skipping decoding entirely because of hardware constraints at a network or a user equipment, such as low memory or low performance speed. Like previous aspects, the decoder decision engine 314 may alter the number of decoding iterations associated with a current of subsequent code block where comparing component 308 determines that a reliability indicator of a current code block is less than the reliability threshold 312.

As illustrated, decoding manager 106 may include a CRC component 318, which may be configured to perform a cyclic redundancy check of CRC bits of a transport block to determine whether the transport block was correctly received. According to an aspect, CRC component 318 may perform such a cyclic redundancy check where decoder decision engine 314, another component of decoding manager 106, or a component of user equipment or network entity with which decoding manager 106 is associated determines that each code block of the transport block has been decoded, or that the reliability indicators 310 of each code block of the transport block were determined to be greater than reliability threshold 312.

Figure 4:
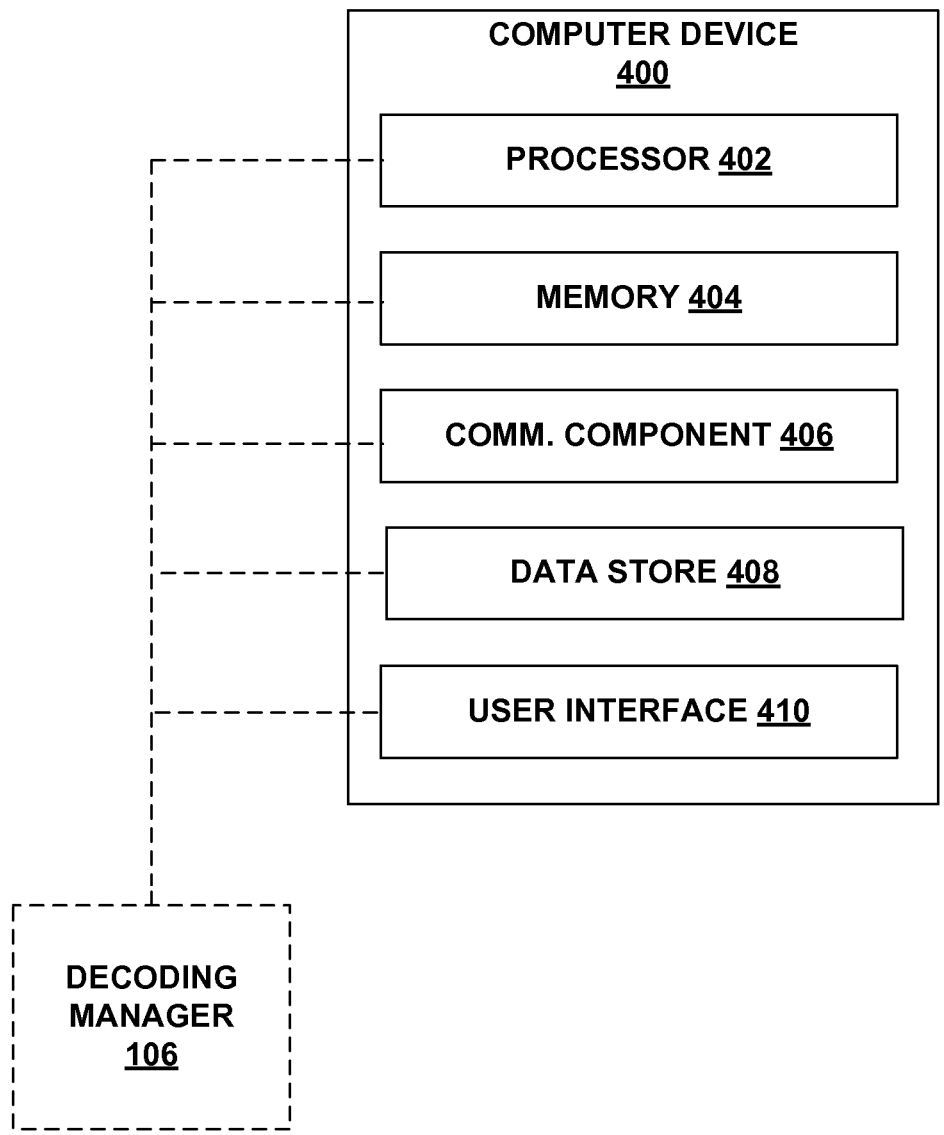
FIG. 4 is a block diagram illustrating an example generic computer device including an optional decoding manager according to the present disclosure.

Referring to FIG. 4, in one aspect, user equipment 102 and/or network entity 104 (FIG. 1) may include a specially programmed or configured computer device. FIG. 4 illustrates an exemplary computer device 400 that includes a processor 402 for carrying out processing functions associated with one or more of components and functions described herein. Processor 402 can include a single or multiple set of processors or multi-core processors. Moreover, processor 402 can be implemented as an integrated processing system and/or a distributed processing system. Additionally, processor 402 may be configured to perform the functions described herein related to improved transport block decoding in wireless networks.

Computer device 400 further includes a memory 404, such as for storing data used herein and/or local versions of applications being executed by processor 402. Memory 404 can include any type of memory usable by a computer, such as random access memory (RAM), read only memory (ROM), tapes, magnetic discs, optical discs, volatile memory, non-volatile memory, and any combination thereof. Additionally, memory 404 may be configured to store data and/or code or computer-readable instructions for performing the functions described herein related to improved transport block decoding in wireless networks.

Further, as illustrated, computer device 400 includes a communications component 406 that provides for establishing and maintaining communications with one or more entities utilizing one or more of hardware, software, and services as described herein. Communications component 406 may carry communication signals between components on computer device 400, as well as exchanging communication signals between computer device 400 and external devices, such as devices located across a wired or wireless communications network and/or devices serially or locally connected to computer device 400. For example, communications component 406 may include one or more buses, and may further include transmit chain components and receive chain components associated with a transmitter and receiver, respectively, or a transceiver, operable for interfacing with external devices. In an additional aspect, communications component 406 may be configured to perform the functions described herein related to improved transport block decoding in wireless networks.

Additionally, computer device 400 may further include a data store 408, which can be any suitable combination of hardware and/or software, that provides for mass storage of information, databases, and programs employed in connection with aspects described herein. For example, data store 408 may be a data repository for applications and data not currently being executed by processor 402, such as those related to the aspect described herein.

Computer device 400 may additionally include a user interface component 410 operable to receive inputs from a user of computer device 400, and further operable to generate outputs for presentation to the user. User interface component 410 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 410 may include one or more output devices, including but not limited to a display, a speaker, a haptic feedback mechanism, a printer, any other mechanism capable of presenting an output to a user, or any combination thereof.

Additionally, as shown, computer device 400 may implement decoding manager 106 of FIGS. 1 and 3). For example, computer device 400 may implement decoding manager 106 using specially programmed computer readable instructions or code, firmware, hardware, one or more processor modules, or some combination thereof. As illustrated computer device 400 may use one or more of processor 402, memory 404, communications component 406, data store 408 and user interface 410 in implementing decoding manager 106. In one such example, code block decoding component 302, comparing component 308, decoder decision engine 314, retransmission component 316 and CRC component 318 may be implemented in software executed by processor 402. Various data used by these components, such as reliability indicator 310 and reliability threshold 312 may be stored by memory 404 and retrieved by processor 402 for use by the components.

Figure 5:
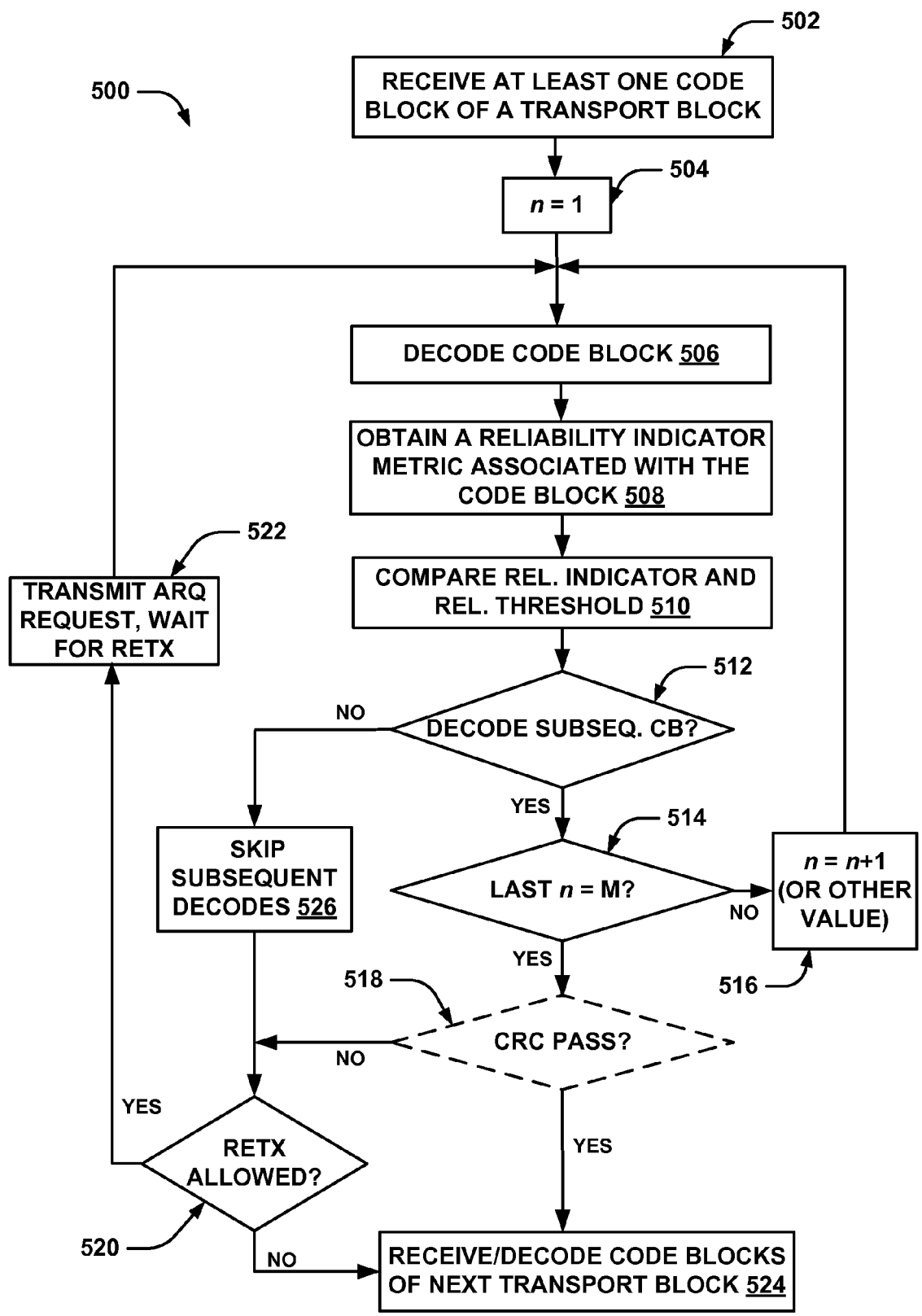
FIG. 5 is a flow diagram illustrating a non-limiting example of a methodology for improved transport block and code block decoding according to the present disclosure.

FIG. 5 is a flow diagram of an example, non-limiting methodology 500 for improved transport block decoding according to the present description. This method may be implemented, for example, by a UE 102, network entity 104 (FIG. 1), and/or a computing device, such as computer device 400, implementing a decoding manager 106, such as illustrated in FIG. 3. In an aspect, at block 502, a receiving device—such as, but not limited to, UE 102, network entity 104, or a communications component 406 of computer device 400, which may be a user equipment or network device or component thereof—may receive at least one code block of a transport block from a transmitting device. According to some examples, the transport block may comprise M code blocks and/or may include one or more CRC bits. Furthermore, the receiving device may store the received at least one code block and/or the CRC bits in a receiver queue (also referred to herein as a decoder queue) upon receipt. This queue may be implemented using memory 404 of the device.

Next, in an aspect, the receiving device may decode a code block $C_n$ of the plurality of received code blocks at block 506, for example, at a decoding manager 106 (FIGS. 1, 3, and 4), code block decoding component 302, and/or decoder 304 (FIG. 3). In one aspect, the receiving device (e.g., utilizing decoder 304) may optionally decode the code blocks sequentially beginning at the first received code block of the transport block, and may therefore initially set n=1, as shown at block 504. Alternatively, the receiving device (e.g., utilizing decoder 304) may attempt to decode the code blocks out of order, randomly, according to a non-sequential pattern, and/or according to a list of those code blocks that have not been deemed likely received successfully during a previous decode iteration. Furthermore, the receiving device (e.g., utilizing decoder 304) may decode or attempt to decode a code block a plurality of times, such as up to a configured or dynamic maximum number of decoding iterations. This maximum number of decoding iterations may be set to a static value by, for example, a user, manufacturer, or network or may be updated dynamically by a component in the receiving device based on one or more factors, such as, but not limited to, a device hardware configuration.

In a further aspect, based on one or more bits of information produced as a result of the decoding of block 506, the receiving device (e.g., via reliability indicator obtaining component 306) may obtain a reliability indicator associated with the code block at block 508. In a non-limiting aspect, the reliability indicator may include the minimum absolute value of the logarithm-likelihood ratio (Min_LLR) of each information bit returned by the code block decoding. The logarithm-likelihood ratio represents the logarithm of the ratio of the probability that a given bit d in a code block stream will be interpreted as 1 by a decoder (e.g., decoder 304) to the probability that d will be interpreted as 0 by the decoder. In an aspect, therefore, the logarithm likelihood ratio of d (LLRd) may be determined according to the following function:

$$LLR_d = \log \frac{p(d=1)}{p(d=0)}$$

In an aspect, the probabilities p(d=1) and p(d=0) may be based on past decoding results or iterations, and may therefore be a posteriori probabilities. These past results may be stored by a computer device executing methodology 500 (e.g., UE 102 or network entity 104) in a memory (e.g., memory 404 of computer device 400).

Furthermore, in a non-limiting example, Min_LLR, and therefore the reliability indicator R, for each decoding iteration of a code block of length k may be computed (e.g., by reliability indicator obtaining component 306) according to the following function:

$$R = \min_{1 \le d \le k} |LLR_d|$$

In a further non-limiting aspect, the reliability indicator (e.g., the Min_LLR) for a code block may be computed (e.g., via reliability indicator obtaining component 306) and compared against a reliability indicator at block 510 after each of one or more code block decoding iterations. In such a non-limiting aspect, the UE may set the reliability indicator as the greatest, least, average, mean, median, minimum reliability indicator of all past decoding iterations during a particular transmission or retransmission (or optionally during all current and past transmissions). Thus, in a non-limiting example where the average reliability indicator of any current or past decoding iterations is utilized as the reliability indicator for a code block undergoing (or having undergone, if between iterations) an mth decoding iteration (associated with either a current transmission/retransmission or all current and past transmissions/retransmissions), the reliability indicator R of the code block may be computed according to the following function:

$$R_m = \frac{\sum_{x=1}^{m} R_x}{m}$$

Furthermore, once computed, reliability indicator 310 may be stored in memory 404.

In an additional aspect, at block 510, the receiving device (e.g., comparing component 308) may compare the reliability indicator 310 to a reliability threshold 312 stored in memory 404. In some non-limiting aspects, this comparison may be performed after every decoding iteration, after a particular number of decoding iterations, or after the maximum number of decoding iterations. As noted above, reliability threshold 312 may be pre-determined and stored in the memory 404 or data store 408 of a UE and/or network entity by a designer, manufacturer, user, network administrator, or the like, or may be dynamically set and/or updated according to one or more network conditions (e.g., loading and/or channel conditions).

At block 512, based at least on the comparison of block 510, the receiving device may determine whether to decode a subsequent code block of the transport block at, for example, decoder decision engine 314 of FIG. 3. In an aspect, the receiving device may determine to decode a subsequent code block where the reliability indicator 310 is greater than (or optionally equal to) the reliability threshold 312 at block 510. If the receiving device determines to decode a subsequent code block, the receiving device (e.g. by utilizing decoder decision engine 314 of FIG. 3) may further determine, at block 514, whether the current SB is the last code block of the received transport block to be decoded, for example, by comparing the n value of the code block to the M value of the transport block. Where the n value does not equal to the M value, the receiving device (e.g., utilizing decoder 304) may increment the n value by 1 (for a sequential decoding scheme) or may otherwise choose a next n value to identify the next code block of the transport block to be decoded at block 516 and may return to block 506 to begin decoding the chosen next code block (e.g., via decoder 304). Alternatively, where the current code block is the last code block of the transport block to be decoded, or, for example, the n value equals to the M value, the receiving device (e.g., decoder 304) may optionally pass the decoded transport block to a CRC checking component (e.g., CRC component 318) to determine whether the CRC of the transport block passes at block 518. Where the CRC passes, the receiving device (e.g., decoder 304) may look to the receiver queue to receive and/or decode code blocks of a next received transport block at block 524. Alternatively, where the CRC does not pass, the receiving device (e.g., retransmission component 316) may request the transmitting device to retransmit the transport block at block 522, for example, where it determines that the receiving device and/or network are configured to execute retransmission procedures or otherwise "allowed" at block 520.

In an additional or alternative aspect, the receiving device (e.g., decoding manager 106 of FIGS. 1 and 2) may bypass the error check procedure (e.g. a CRC check) on a decoded version of the transport block where the receiving device (e.g. via decoder decision engine 314 and/or CRC component 318 of FIG. 3) determines that the decoding of each code block in the transport block was reliable. In a non-limiting example, the receiving device may make such a determination of transport block reliability after each code block of the transport block had been decoded (e.g. by decoder 304) and where a component of the receiving device (e.g. comparing component 308) determined that the reliability indicator (e.g. the Min_LLR) associated with each code block of the fully-decoded transport block was above (or, in some examples, equal to) a error check bypass threshold. In an aspect, this error check bypass threshold may have any value, which may be pre-configured by a user, UE, network, device manufacturer, or any other configuring entity, or may have a dynamic value that may be altered by a configuring entity over time. In an additional non-limiting aspect, such dynamic error check bypass threshold value alterations may depend on one or more device, network, or communication link conditions.

Furthermore, in some non-limiting examples, an error check bypass threshold may have a value greater than that of the reliability threshold associated with a receiving device. In such examples, the receiving device may be configured to (1) stop decoding subsequent code blocks where a component of the receiving device (e.g. comparing component 308) determines that a code block reliability indicator is less than (or, in some examples, equal to) the reliability threshold, (2) bypass the error check procedure where each reliability indicator of the code blocks of the transport block exceeds or exceeded the error check bypass threshold, and (3) continue decoding subsequent code blocks of the transport block where the reliability indicator is greater than the reliability threshold and continue performing the error check procedure where any reliability indicator of any decoded code block is determined (e.g. by comparing component 308) to be less than the error check threshold.

Returning to block 512, the receiving device (e.g., decoder 304) may alternatively determine not to decode any subsequent SBs at block 512. In an aspect, this may result from the receiving device determining (e.g., via comparing component 308 of FIG. 3) that the current code block was likely not correctly received and decoded based on its reliability indicator 310 being less than (or optionally equal to) the reliability threshold 312 at block 510. In an aspect, where the receiving device (e.g., utilizing decoder decision engine 314 of FIG. 3) determines that subsequent code blocks of the transport block will not be decoded, it may issue a command (e.g., utilizing decoder decision engine 314) to a decoder to skip subsequent decodes for code blocks of the transport block at block 526. Thereafter, the receiving device (e.g., retransmission component 316) may request the transmitting device to retransmit the transport block at block 522 where it determines retransmission is allowed (e.g., whether the transmitting and/or receiving device or a network associated with one or both of these devices is configured with data retransmission functionality) at block 520.

By utilizing such a method, the receiving device, which in a non-limiting aspect may comprise a user equipment or network component, may save power as a result of reducing the amount of decoding activity at the receiving device. Furthermore, by utilizing the method, the receiving device may reduce wasted time in the data transmission cycle thereby increasing data throughput.

Figure 6:
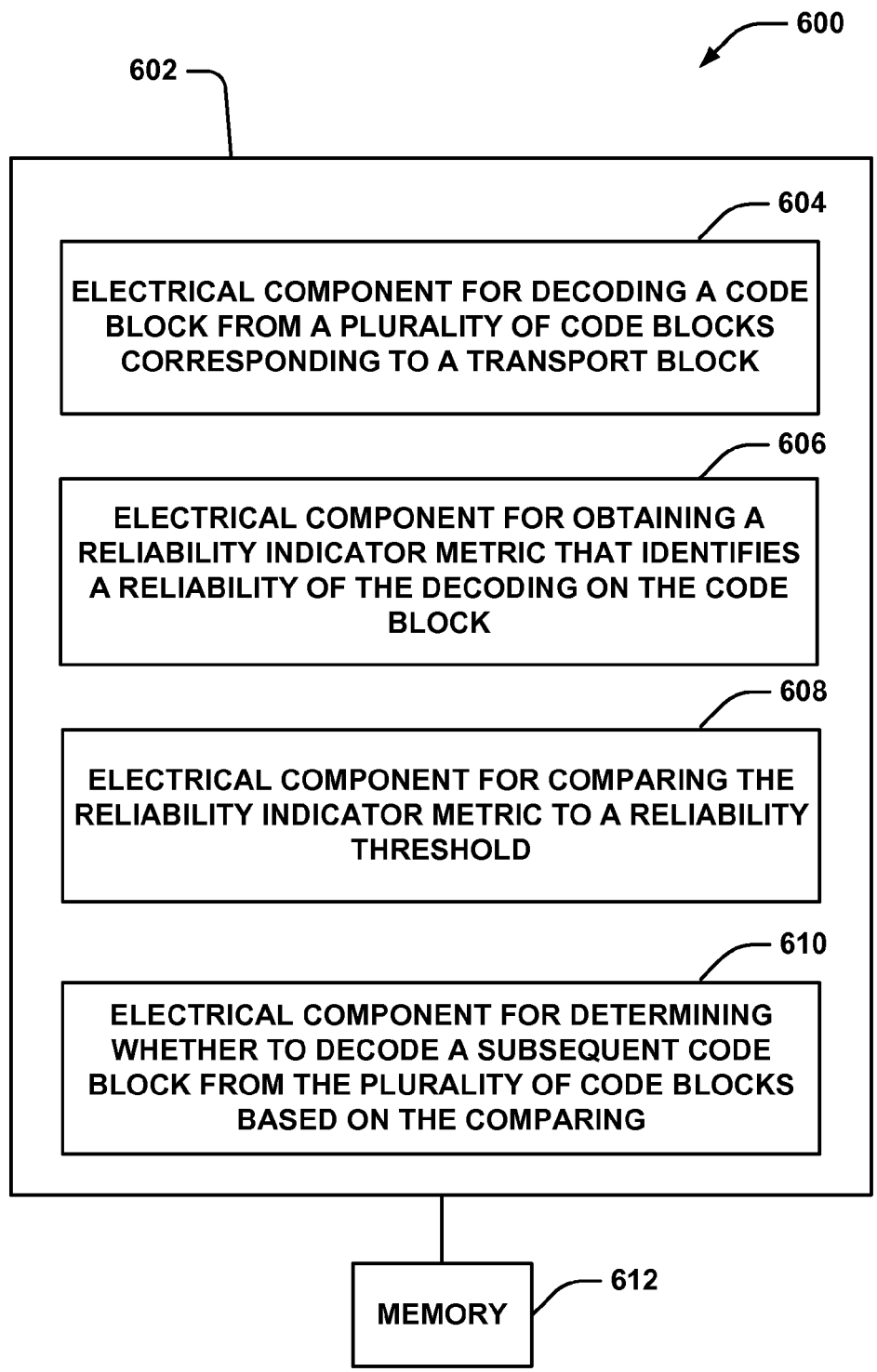
FIG. 6 is a block diagram describing an example logical grouping of electrical components for carrying out improved transport block and code block decoding according to the present disclosure.

Referring to FIG. 6, an example system 600 is displayed for improved transport block decoding in a user equipment or network device. For example, system 600 can reside at least partially within a user equipment, such as UE 102 (FIG. 1) or partially within a network entity, such as network entity 104 (FIG. 1). It is to be appreciated that system 600 is represented as including functional blocks, which can be functional blocks that represent functions implemented by a processor, software, or combination thereof (e.g., firmware). System 600 includes a logical grouping 602 of electrical components that can act in conjunction. In an aspect, logical grouping 602 may include one or more of the components of decoding manager 106 illustrated in FIG. 3, but may include other electrical components for performing each function associated with electrical components 604, 606, 608, and/or 610.

For instance, logical grouping 602 can include an electrical component 604 for decoding a code block from a plurality of code blocks corresponding to a transport block. In an aspect, electrical component 604 may include decoder 304, code block decoding component 302, or a component thereof (FIG. 3). In addition, logical grouping 602 can include an electrical component 606 for obtaining a reliability indicator metric that identifies a reliability of the decoding of the code block. In an aspect, electrical component 606 may include reliability indicator obtaining component 306 or a component thereof (FIG. 3). Furthermore, logical grouping 602 can include an electrical component 608 for comparing the reliability indicator to a reliability threshold. In an aspect, electrical component 608 may include comparing component 308 or a component thereof (FIG. 3). Moreover, logical grouping 602 can include an electrical component 610 for determining whether to decode a subsequent code block from the plurality of code blocks based on the comparing. In an aspect, electrical component 610 may include decoder decision engine 314 or a component thereof (FIG. 3). In one example, electrical components 604, 606, 608, and 610 can comprise at least one processor, or each electrical component 604, 606, 608, and 610 can be a corresponding module of at least one processor. Moreover, in an additional or alternative example, electrical components 604, 606, 608, and 610 can be a computer program product including a computer readable medium, where each electrical component 604, 606, 608, and 610 can be corresponding code or instructions.

Additionally, system 600 can include a memory 610 that retains instructions for executing functions associated with the electrical components 604, 606, 608, and 610, stores data used or obtained by the electrical components 604, 606, 608, and 610, etc. While shown as being external to memory 612, it is to be understood that one or more of the electrical components 604, 606, 608, and 610 can exist within memory 612.

Figure 7:
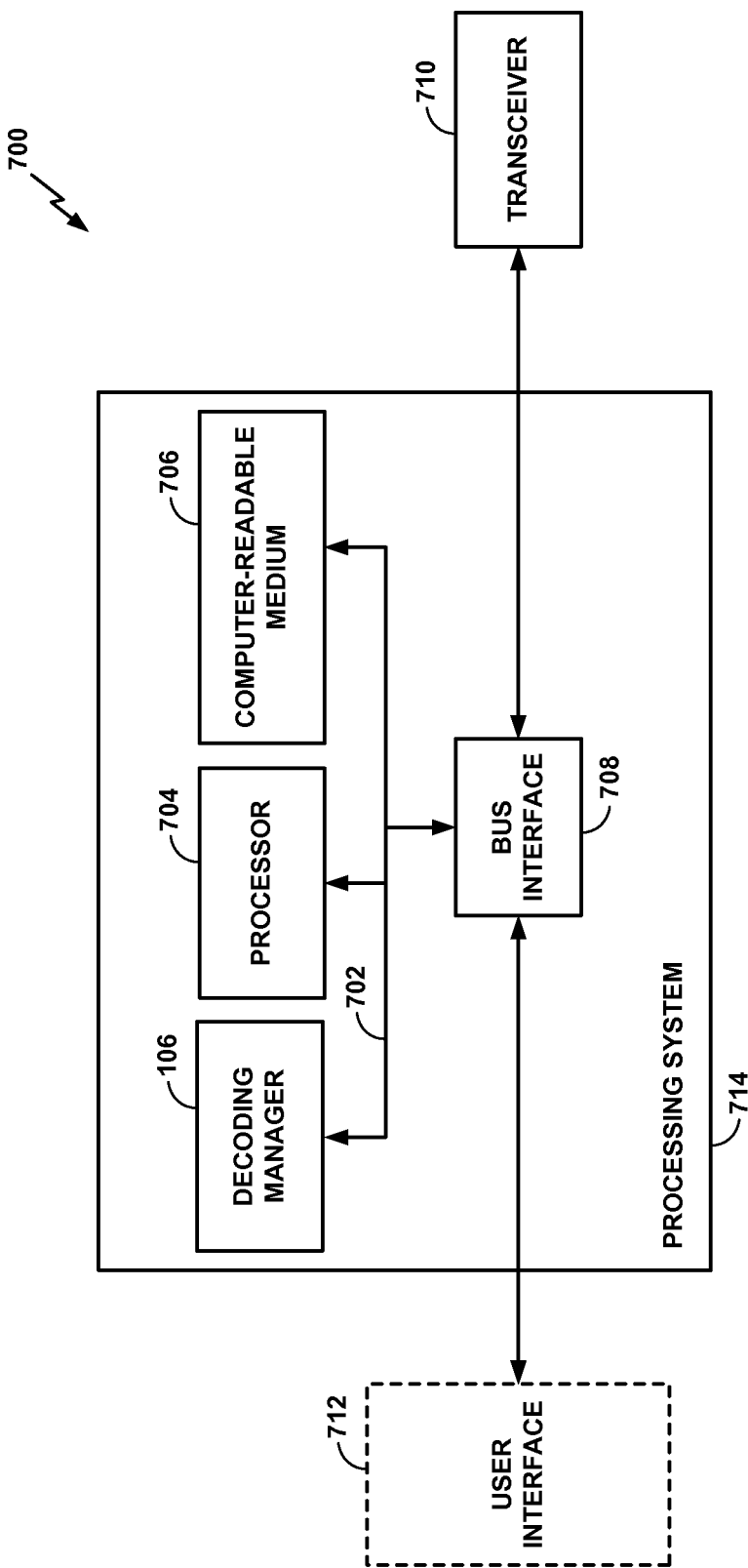
FIG. 7 is a block diagram illustrating an example of a hardware implementation for an apparatus employing a processing system according to the present disclosure.

FIG. 7 is a block diagram illustrating an example of a hardware implementation for an apparatus 700 employing a processing system 714. In this example, the processing system 714 may include one or more of the components of computer device 400 of FIG. 4, but may include additional or alternative components, and may be implemented with a bus architecture, represented generally by the bus 702. The bus 702 may include any number of interconnecting buses and bridges depending on the specific application of the processing system 714 and the overall design constraints. The bus 702 links together various circuits including decoding manager 106 (FIGS. 1 and 2), one or more processors, represented generally by the processor 704, and computer-readable media, represented generally by the computer-readable medium 706. The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a means for communicating with various other apparatus over a transmission medium. Depending upon the nature of the apparatus, a user interface 712 (e.g., keypad, display, speaker, microphone, joystick) may also be provided.

The processor 704 is responsible for managing the bus 702 and general processing, including the execution of software stored on the computer-readable medium 706. The software, when executed by the processor 704, causes the processing system 714 to perform the various functions described infra for any particular apparatus. The computer-readable medium 706 may also be used for storing data that is manipulated by the processor 704 when executing software.

Figure 8:
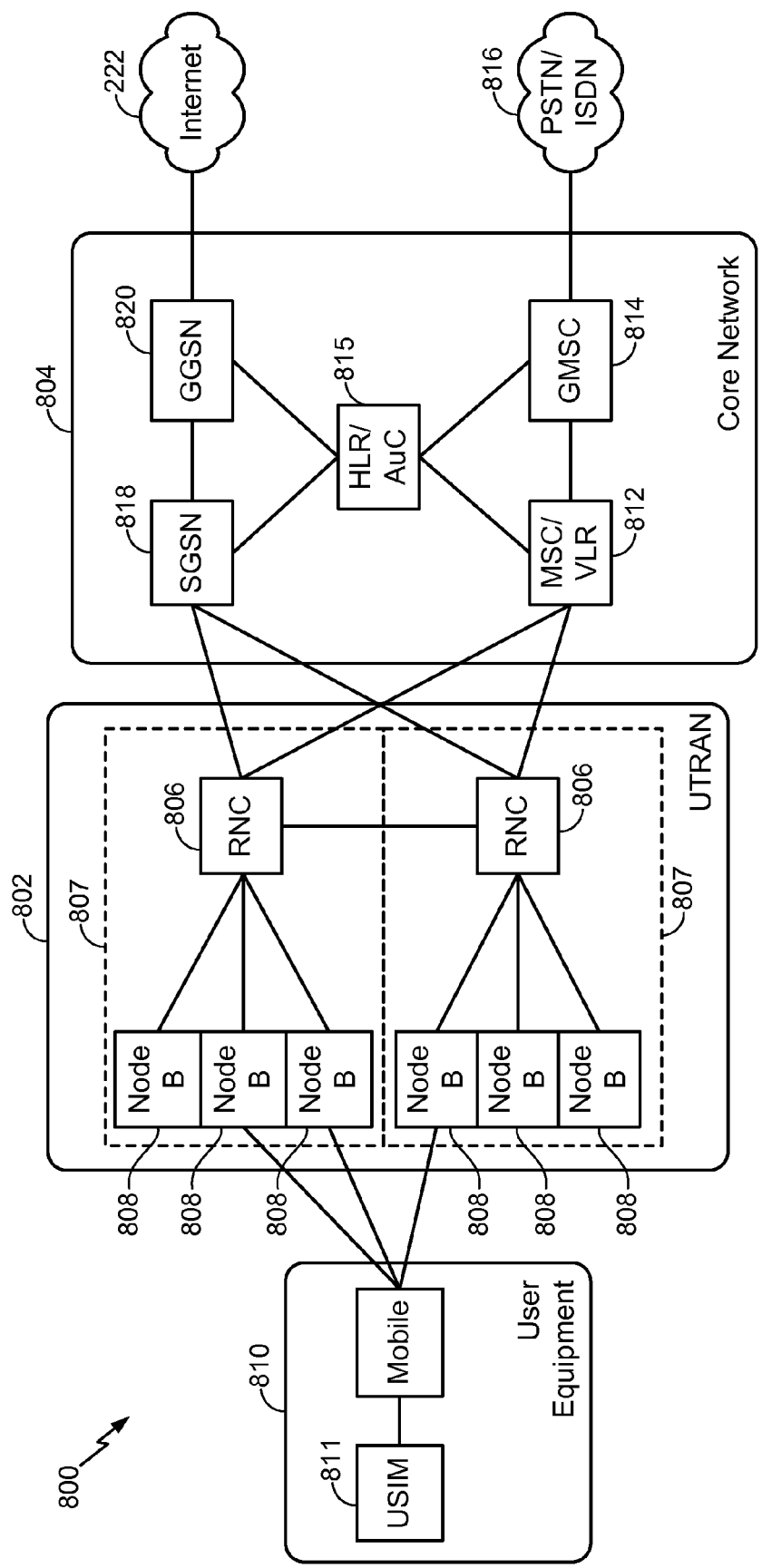
FIG. 8 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 8 are presented with reference to a UMTS system 800 employing a W-CDMA air interface. A UMTS network includes three interacting domains: a Core Network (CN) 804, a UMTS Terrestrial Radio Access Network (UTRAN) 802, and User Equipment (UE) 810. In this example, the UTRAN 802 provides various wireless services including telephony, video, data, messaging, broadcasts, and/or other services. The UTRAN 802 may include a plurality of Radio Network Subsystems (RNSs) such as an RNS 807, each controlled by a respective Radio Network Controller (RNC) such as an RNC 806. Here, the UTRAN 802 may include any number of RNCs 806 and RNSs 807 in addition to the RNCs 806 and RNSs 807 illustrated herein. The RNC 806 is an apparatus responsible for, among other things, assigning, reconfiguring, and releasing radio resources within the RNS 807. The RNC 806 may be interconnected to other RNCs (not shown) in the UTRAN 802 through various types of interfaces such as a direct physical connection, a virtual network, or the like, using any suitable transport network.

Communication between a UE 810 and a Node B 808 may be considered as including a physical (PHY) layer and a medium access control (MAC) layer. Further, communication between a UE 810 and an RNC 806 by way of a respective Node B 808 may be considered as including a radio resource control (RRC) layer. In the instant specification, the PHY layer may be considered layer 6; the MAC layer may be considered layer 8; and the RRC layer may be considered layer 3. Information hereinbelow utilizes terminology introduced in the RRC Protocol Specification, 3GPP TS 85.331 v9.1.0, incorporated herein by reference.

The geographic region covered by the RNS 807 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 808 are shown in each RNS 807; however, the RNSs 807 may include any number of wireless Node Bs. The Node Bs 808 provide wireless access points to a CN 804 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 810 may further include a universal subscriber identity module (USIM) 811, which contains a user's subscription information to a network. For illustrative purposes, one UE 810 is shown in communication with a number of the Node Bs 808. The DL, also called the forward link, refers to the communication link from a Node B 808 to a UE 810, and the UL, also called the reverse link, refers to the communication link from a UE 810 to a Node B 808.

The CN 804 interfaces with one or more access networks, such as the UTRAN 802. As shown, the CN 804 is a GSM core network. However, as those skilled in the art will recognize, the various concepts presented throughout this disclosure may be implemented in a RAN, or other suitable access network, to provide UEs with access to types of CNs other than GSM networks.

The CN 804 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 804 supports circuit-switched services with a MSC 812 and a GMSC 814. In some applications, the GMSC 814 may be referred to as a media gateway (MGW). One or more RNCs, such as the RNC 806, may be connected to the MSC 812. The MSC 812 is an apparatus that controls call setup, call routing, and UE mobility functions. The MSC 812 also includes a VLR that contains subscriber-related information for the duration that a UE is in the coverage area of the MSC 812. The GMSC 814 provides a gateway through the MSC 812 for the UE to access a circuit-switched network 816. The GMSC 814 includes a home location register (HLR) 815 containing subscriber data, such as the data reflecting the details of the services to which a particular user has subscribed. The HLR is also associated with an authentication center (AuC) that contains subscriber-specific authentication data. When a call is received for a particular UE, the GMSC 814 queries the HLR 815 to determine the UE's location and forwards the call to the particular MSC serving that location.

The CN 804 also supports packet-data services with a serving GPRS support node (SGSN) 818 and a gateway GPRS support node (GGSN) 820. GPRS, which stands for General Packet Radio Service, is designed to provide packet-data services at speeds higher than those available with standard circuit-switched data services. The GGSN 820 provides a connection for the UTRAN 802 to a packet-based network 822. The packet-based network 822 may be the Internet, a private data network, or some other suitable packet-based network. The primary function of the GGSN 820 is to provide the UEs 810 with packet-based network connectivity. Data packets may be transferred between the GGSN 820 and the UEs 810 through the SGSN 818, which performs primarily the same functions in the packet-based domain as the MSC 812 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 808 and a UE 810. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 810 provides feedback to the node B 808 over the HS-DPCCH to indicate whether it correctly decoded a packet on the downlink.

HS-DPCCH further includes feedback signaling from the UE 810 to assist the node B 808 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 808 and/or the UE 810 may have multiple antennas supporting MIMO technology. The use of MIMO technology enables the node B 808 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 810 to increase the data rate or to multiple UEs 810 to increase the overall system capacity. This is achieved by spatially precoding each data stream and then transmitting each spatially precoded stream through a different transmit antenna on the downlink. The spatially precoded data streams arrive at the UE(s) 810 with different spatial signatures, which enables each of the UE(s) 810 to recover the one or more the data streams destined for that UE 810. On the uplink, each UE 810 may transmit one or more spatially precoded data streams, which enables the node B 808 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 9:
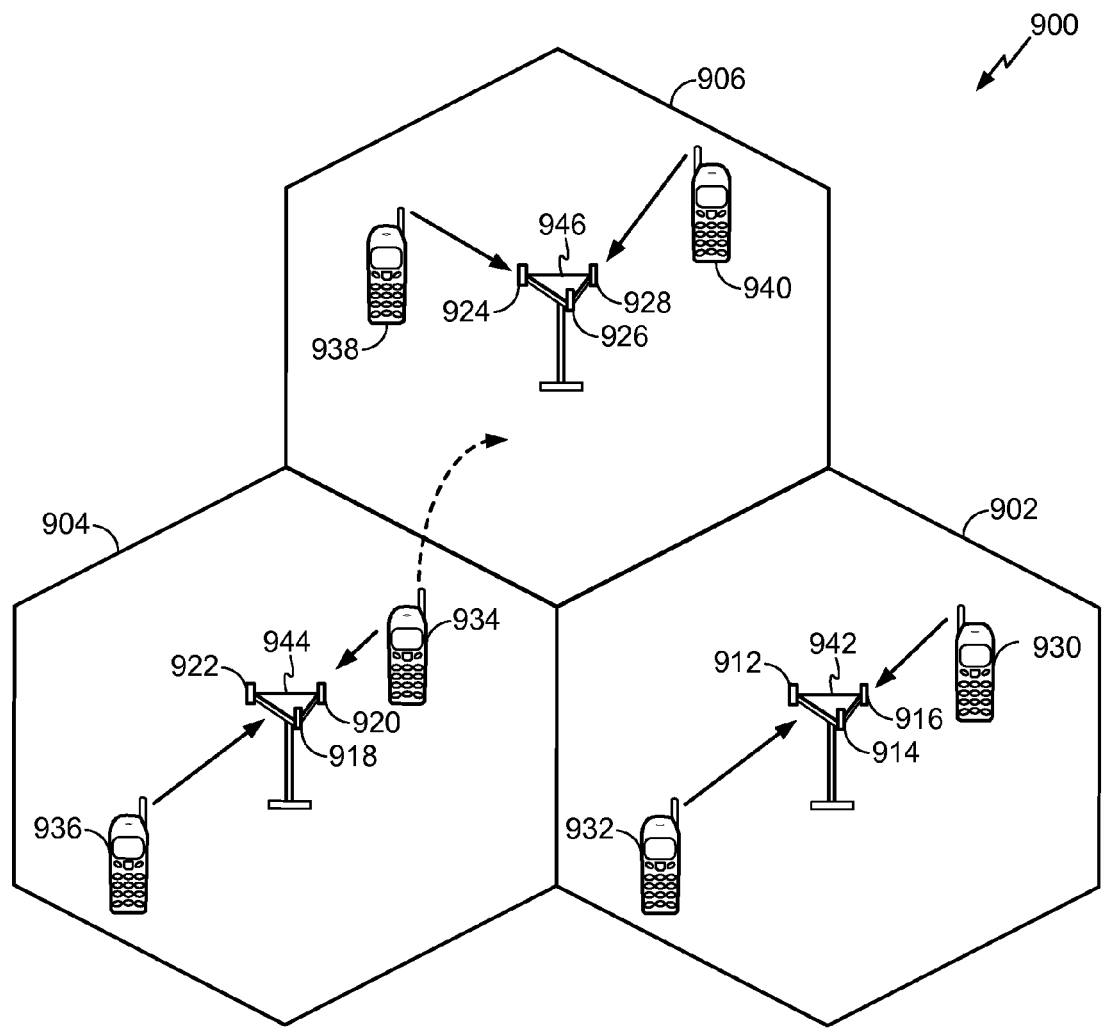
FIG. 9 is a conceptual diagram illustrating an example of an access network.

Referring to FIG. 9, an access network 900 in a UTRAN architecture is illustrated. The multiple access wireless communication system includes multiple cellular regions (cells), including cells 902, 904, and 906, each of which may include one or more sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 may include several wireless communication devices, e.g., User Equipment or UEs, which may be in communication with one or more sectors of each cell 902, 904 or 906. For example, UEs 930 and 932 may be in communication with Node B 942, UEs 934 and 936 may be in communication with Node B 944, and UEs 938 and 940 can be in communication with Node B 946. Here, each Node B 942, 944, 946 is configured to provide an access point to a CN 204 (see FIG. 7) for all the UEs 930, 932, 934, 936, 938, 940 in the respective cells 902, 904, and 906.

As the UE 934 moves from the illustrated location in cell 904 into cell 906, a serving cell change (SCC) or handover may occur in which communication with the UE 934 transitions from the cell 904, which may be referred to as the source cell, to cell 906, which may be referred to as the target cell. Management of the handover procedure may take place at the UE 934, at the Node Bs corresponding to the respective cells, at a radio network controller 806 (see FIG. 8), or at another suitable node in the wireless network. For example, during a call with the source cell 904, or at any other time, the UE 934 may monitor various parameters of the source cell 904 as well as various parameters of neighboring cells such as cells 906 and 902. Further, depending on the quality of these parameters, the UE 934 may maintain communication with one or more of the neighboring cells. During this time, the UE 934 may maintain an Active Set, that is, a list of cells that the UE 934 is simultaneously connected to (i.e., the UTRA cells that are currently assigning a downlink dedicated physical channel DPCH or fractional downlink dedicated physical channel F-DPCH to the UE 934 may constitute the Active Set).

The modulation and multiple access scheme employed by the access network 900 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 9rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 9GPP organization. CDMA2000 and UMB are described in documents from the 9GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 10.

Figure 10:
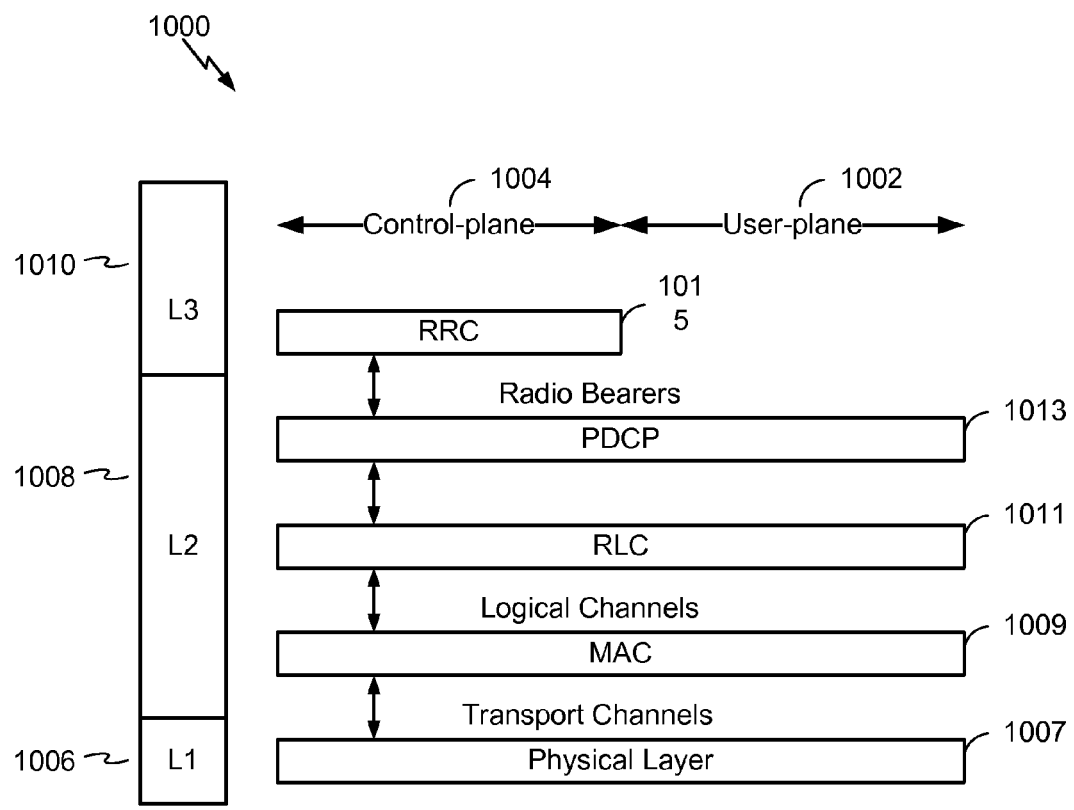
FIG. 10 is a conceptual diagram illustrating an example of a radio protocol architecture for the user and control plane.

Referring to FIG. 10 an example radio protocol architecture 1000 relates to the user plane 1002 and the control plane 1004 of a user equipment (UE) or node B/base station. For example, architecture 1000 may be included in a UE such as user equipment 102. The radio protocol architecture 1000 for the UE and node B is shown with three layers: Layer 6 1006, Layer 2 1008, and Layer 3 1010. Layer 6 1006 is the lowest lower and implements various physical layer signal processing functions. As such, Layer 6 1006 includes the physical layer 1007. Layer 2 (L2 layer) 1008 is above the physical layer 1007 and is responsible for the link between the UE and node B over the physical layer 1007. Layer 3 (L3 layer) 1010 includes a radio resource control (RRC) sublayer 1015. The RRC sublayer 1015 handles the control plane signaling of Layer 3 between the UE and the UTRAN.

In the user plane, the L2 layer 1008 includes a media access control (MAC) sublayer 1009, a radio link control (RLC) sublayer 1011, and a packet data convergence protocol (PDCP) 1013 sublayer, which are terminated at the node B on the network side. Although not shown, the UE may have several upper layers above the L2 layer 1008 including a network layer (e.g., IP layer) that is terminated at a PDN gateway on the network side, and an application layer that is terminated at the other end of the connection (e.g., far end UE, server, etc.).

The PDCP sublayer 1013 provides multiplexing between different radio bearers and logical channels. The PDCP sublayer 1013 also provides header compression for upper layer data packets to reduce radio transmission overhead, security by ciphering the data packets, and handover support for UEs between node Bs. The RLC sublayer 1011 provides segmentation and reassembly of upper layer data packets, retransmission of lost data packets, and reordering of data packets to compensate for out-of-order reception due to hybrid automatic repeat request (HARQ). The MAC sublayer 1009 provides multiplexing between logical and transport channels. The MAC sublayer 1009 is also responsible for allocating the various radio resources (e.g., resource blocks) in one cell among the UEs. The MAC sublayer 1009 is also responsible for HARQ operations.

Figure 11:
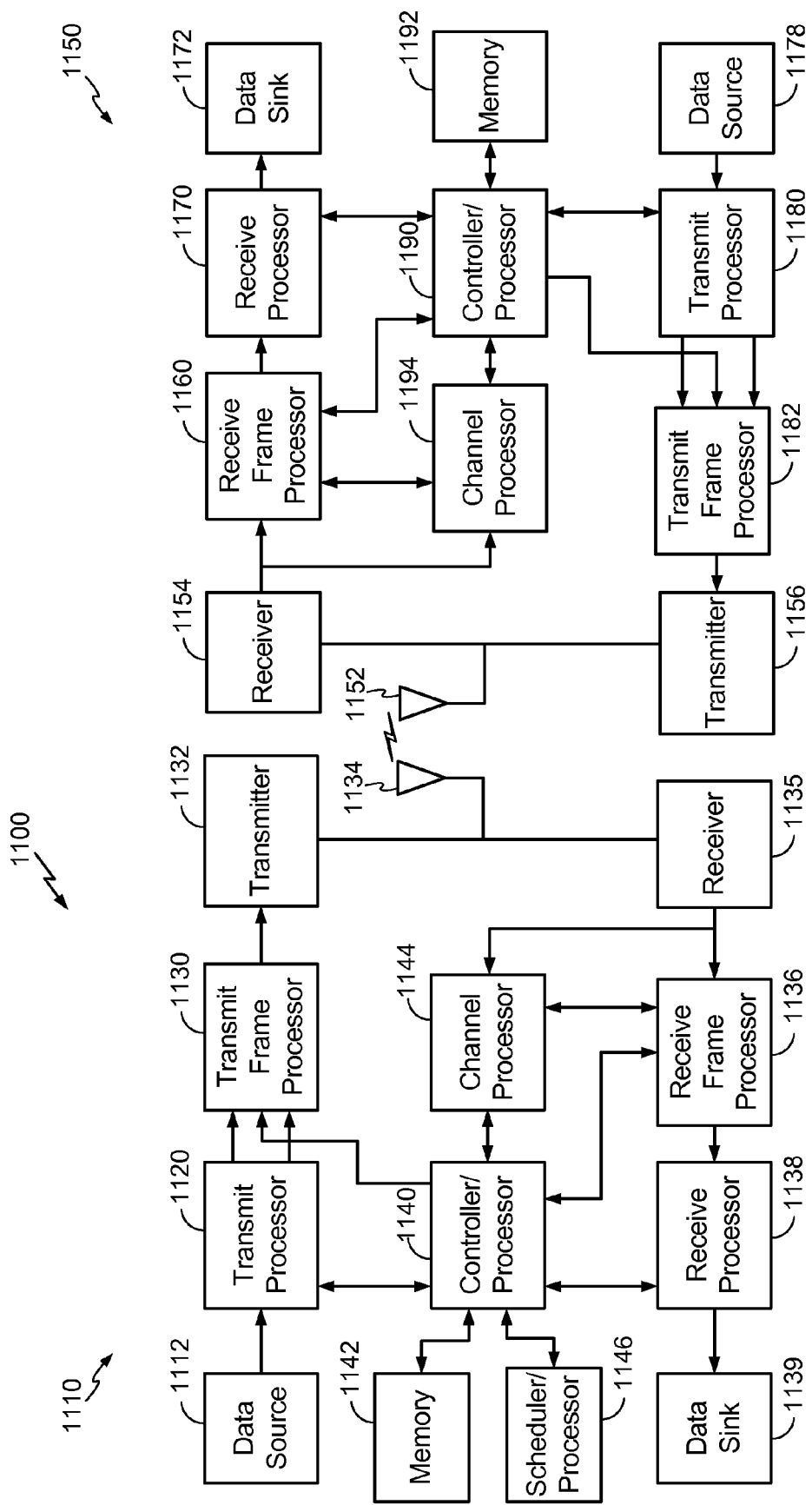
FIG. 11 is a block diagram conceptually illustrating an example of a Node B in communication with a UE in a telecommunications system.

FIG. 11 is a block diagram of a Node B 1110 in communication with a UE 1150, where the Node B 1110 may be the Node B 808 in FIG. 8, and the UE 1150 may be the UE 810 in FIG. 8. In the downlink communication, a transmit processor 1120 may receive data from a data source 1112 and control signals from a controller/processor 1140. The transmit processor 1120 provides various signal processing functions for the data and control signals, as well as reference signals (e.g., pilot signals). For example, the transmit processor 1120 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1144 may be used by a controller/processor 1140 to determine the coding, modulation, spreading, and/or scrambling schemes for the transmit processor 1120. These channel estimates may be derived from a reference signal transmitted by the UE 1150 or from feedback from the UE 1150. The symbols generated by the transmit processor 1120 are provided to a transmit frame processor 1130 to create a frame structure. The transmit frame processor 1130 creates this frame structure by multiplexing the symbols with information from the controller/processor 1140, resulting in a series of frames. The frames are then provided to a transmitter 1132, which provides various signal conditioning functions including amplifying, filtering, and modulating the frames onto a carrier for downlink transmission over the wireless medium through antenna 1134. The antenna 1134 may include one or more antennas, for example, including beam steering bidirectional adaptive antenna arrays or other similar beam technologies.

At the UE 1150, a receiver 1154 receives the downlink transmission through an antenna 1152 and processes the transmission to recover the information modulated onto the carrier. The information recovered by the receiver 1154 is provided to a receive frame processor 1160, which parses each frame, and provides information from the frames to a channel processor 1194 and the data, control, and reference signals to a receive processor 1170. The receive processor 1170 then performs the inverse of the processing performed by the transmit processor 1120 in the Node B 1110. More specifically, the receive processor 1170 descrambles and despreads the symbols, and then determines the most likely signal constellation points transmitted by the Node B 1110 based on the modulation scheme. These soft decisions may be based on channel estimates computed by the channel processor 1194. The soft decisions are then decoded and deinterleaved to recover the data, control, and reference signals. The CRC codes are then checked to determine whether the frames were successfully decoded. The data carried by the successfully decoded frames will then be provided to a data sink 1172, which represents applications running in the UE 1150 and/or various user interfaces (e.g., display). Control signals carried by successfully decoded frames will be provided to a controller/processor 1190. When frames are unsuccessfully decoded by the receiver processor 1170, the controller/processor 1190 may also use an acknowledgement (ACK) and/or negative acknowledgement (NACK) protocol to support retransmission requests for those frames.

In the uplink, data from a data source 1178 and control signals from the controller/processor 1190 are provided to a transmit processor 1180. The data source 1178 may represent applications running in the UE 1150 and various user interfaces (e.g., keyboard). Similar to the functionality described in connection with the downlink transmission by the Node B 1110, the transmit processor 1180 provides various signal processing functions including CRC codes, coding and interleaving to facilitate FEC, mapping to signal constellations, spreading with OVSFs, and scrambling to produce a series of symbols. Channel estimates, derived by the channel processor 1194 from a reference signal transmitted by the Node B 1110 or from feedback contained in the midamble transmitted by the Node B 1110, may be used to select the appropriate coding, modulation, spreading, and/or scrambling schemes. The symbols produced by the transmit processor 1180 will be provided to a transmit frame processor 1182 to create a frame structure. The transmit frame processor 1182 creates this frame structure by multiplexing the symbols with information from the controller/processor 1190, resulting in a series of frames. The frames are then provided to a transmitter 1156, which provides various signal conditioning functions including amplification, filtering, and modulating the frames onto a carrier for uplink transmission over the wireless medium through the antenna 1152.

The uplink transmission is processed at the Node B 1110 in a manner similar to that described in connection with the receiver function at the UE 1150. A receiver 1135 receives the uplink transmission through the antenna 1134 and processes the transmission to recover the information modulated onto the carrier. The information recovered by the receiver 1135 is provided to a receive frame processor 1136, which parses each frame, and provides information from the frames to the channel processor 1144 and the data, control, and reference signals to a receive processor 1138. The receive processor 1138 performs the inverse of the processing performed by the transmit processor 1180 in the UE 1150. The data and control signals carried by the successfully decoded frames may then be provided to a data sink 1139 and the controller/processor, respectively. If some of the frames were unsuccessfully decoded by the receive processor, the controller/processor 1140 may also use an acknowledgement (ACK) and/or negative acknowledgement (NACK) protocol to support retransmission requests for those frames.

The controller/processors 1140 and 1190 may be used to direct the operation at the Node B 1110 and the UE 1150, respectively. For example, the controller/processors 1140 and 1190 may provide various functions including timing, peripheral interfaces, voltage regulation, power management, and other control functions. The computer readable media of memories 1142 and 1192 may store data and software for the Node B 1110 and the UE 1150, respectively. A scheduler/processor 1146 at the Node B 1110 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of decoding, comprising:
    decoding, by a receiving device, a code block from a plurality of code blocks corresponding to a transport block;
    obtaining a reliability indicator that identifies a reliability of the decoding of the code block;
    comparing the reliability indicator to a reliability threshold; and
    determining whether to decode a subsequent code block from the plurality of code blocks based on the comparing.

2. The method of claim 1, further comprising determining not to decode at least one subsequent code block of the transport block where the comparing indicates that the reliability indicator is less than the reliability threshold.

3. The method of claim 2, wherein the at least one subsequent code block comprises any remaining undecoded code blocks of the transport block.

4. The method of claim 2, wherein the at least one subsequent code block comprises a next in-queue code block.

5. The method of claim 2, wherein the at least one subsequent code block comprises a later code block after a next-in-queue code block.

6. The method of claim 2, further comprising reducing a number of iterations of the decoding based on determining to alter the decoding.

7. The method of claim 1, wherein decoding the code block further comprises decoding at a turbo decoder, and wherein obtaining the reliability indicator further comprises obtaining the reliability indicator from the turbo decoder as a result of the decoding.

8. The method of claim 1, further comprising:
determining, at a first time, that the decoding of the code block is reliable based on the comparing;
determining a failure of an error check procedure on a decoded version of the transport block;
receiving a retransmission of the transport block based on the failure in the error check; and
skipping a second decoding of the code block received with the retransmission of the transport block, at a second time, based on determining that the decoding of the code block is reliable at the first time.

9. The method of claim 1, wherein the reliability indicator and the reliability threshold comprise a minimum absolute value of a log-likelihood ratio (LLR) of each information bit returned by the decoding of the code block.

10. The method of claim 1, further comprising skipping an error check procedure on a decoded version of the transport block when the reliability indicator for all of the plurality of code blocks of the transport block indicate that the decoding is reliable.

11. An apparatus for decoding a wireless communication, comprising:
means for decoding a code block from a plurality of code blocks corresponding to a transport block;
means for obtaining a reliability indicator that identifies a reliability of the decoding of the code block;
means for comparing the reliability indicator to a reliability threshold; and
means for determining whether to decode a subsequent code block from the plurality of code blocks based on the comparing.

12. The apparatus of claim 11, further comprising means for determining not to decode at least one subsequent code block of the transport block where the means for comparing indicates that the reliability indicator is less than the reliability threshold.

13. The apparatus of claim 12, wherein the at least one subsequent code block comprises any remaining undecoded code blocks of the transport block.

14. The apparatus of claim 12, wherein the at least one subsequent code block comprises a next in-queue code block.

15. The apparatus of claim 12, wherein the at least one subsequent code block comprises a later code block after a next-in-queue code block.

16. The apparatus of claim 12, further comprising means for reducing a number of iterations of the decoding based on determining to alter the decoding.

17. The apparatus of claim 11, wherein the means for decoding the code block further comprises means for decoding at a turbo decoder, and wherein the means for obtaining the reliability indicator further comprises means for obtaining the reliability indicator from the turbo decoder from the means for decoding.

18. The apparatus of claim 11, further comprising:
means for determining, at a first time, that the decoding of the code block is reliable based on the comparing;
means for determining a failure of an error check procedure on a decoded version of the transport block;
means for receiving a retransmission of the transport block based on the failure in the error check; and
means for skipping a second decoding of the code block received with the retransmission of the transport block, at a second time, based on determining that the decoding of the code block is reliable at the first time.

19. The apparatus of claim 11, wherein the reliability indicator and the reliability threshold comprise a minimum absolute value of a log-likelihood ratio (LLR) of each information bit returned by the decoding of the code block.

20. The apparatus of claim 11, further comprising means for skipping an error check procedure on a decoded version of the transport block when the reliability indicator for all of the plurality of code blocks of the transport block indicate that the decoding is reliable.

21. A non-transitory computer-readable storage medium comprising code for:
decoding a code block from a plurality of code blocks corresponding to a transport block;
obtaining a reliability indicator that identifies a reliability of the decoding of the code block;
comparing the reliability indicator to a reliability threshold; and
determining whether to decode a subsequent code block from the plurality of code blocks based on the comparing.

22. The computer-readable storage medium of claim 21, further comprising code for determining not to decode at least one subsequent code block of the transport block where the comparing indicates that the reliability indicator is less than the reliability threshold.

23. The computer-readable storage medium of claim 22, wherein the at least one subsequent code block comprises any remaining undecoded code blocks of the transport block.

24. The computer-readable storage medium of claim 22, wherein the at least one subsequent code block comprises a next in-queue code block.

25. The computer-readable storage medium of claim 22, wherein the at least one subsequent code block comprises a later code block after a next-in-queue code block.

26. The computer-readable storage medium of claim 22, further comprising code for reducing a number of iterations of the decoding based on determining to alter the decoding.

27. The computer-readable storage medium of claim 21, wherein the code for decoding the code block further comprises code for decoding at a turbo decoder, and wherein the code for obtaining the reliability indicator further comprises code for obtaining the reliability indicator from the turbo decoder as a result of the decoding.

28. The computer-readable storage medium of claim 21, further comprising code for:
determining, at a first time, that the decoding of the code block is reliable based on the comparing;
determining a failure of an error check procedure on a decoded version of the transport block;
receiving a retransmission of the transport block based on the failure in the error check; and
skipping a second decoding of the code block received with the retransmission of the transport block, at a second time, based on determining that the decoding of the code block is reliable at the first time.

29. The computer-readable storage medium of claim 21, wherein the reliability indicator and the reliability threshold comprise a minimum absolute value of a log-likelihood ratio (LLR) of each information bit returned by the decoding of the code block.

30. The computer-readable storage medium of claim 21, further comprising code for skipping an error check procedure on a decoded version of the transport block when the reliability indicator for all of the plurality of code blocks of the transport block indicate that the decoding is reliable.

31. An apparatus for wireless communication, comprising:
   at least one processor; and
   a memory coupled to the at least one processor, wherein the at least one processor is configured to:
      decode a code block from a plurality of code blocks corresponding to a transport block;
      obtain a reliability indicator that identifies a reliability of the decoding of the code block;
      compare the reliability indicator to a reliability threshold; and
      determine whether to decode a subsequent code block from the plurality of code blocks based on the comparing.

32. The apparatus of claim 31, wherein the at least one processor is further configured to determine not to decode at least one subsequent code block of the transport block where the comparing indicates that the reliability indicator is less than the reliability threshold.

33. The apparatus of claim 32, wherein the at least one subsequent code block comprises any remaining undecoded code blocks of the transport block.

34. The apparatus of claim 32, wherein the at least one subsequent code block comprises a next in-queue code block.

35. The apparatus of claim 32, wherein the at least one subsequent code block comprises a later code block after a next-in-queue code block.

36. The apparatus of claim 32, wherein the at least one processor is further configured to reduce a number of iterations of the decoding based on determining not to decode the at least one subsequent code block.

37. The apparatus of claim 31, wherein decoding the code block further comprises decoding at a turbo decoder, and wherein obtaining the reliability indicator further comprises obtaining the reliability indicator from the turbo decoder as a result of the decoding.

38. The apparatus of claim 31, wherein the at least one processor is further configured to:
   determine, at a first time, that the decoding of the code block is reliable based on the comparing;
   determine a failure of an error check procedure on a decoded version of the transport block;
   receive a retransmission of the transport block based on the failure in the error check; and
   skip a second decoding of the code block received with the retransmission of the transport block, at a second time, based on determining that the decoding of the code block is reliable at the first time.

39. The apparatus of claim 31, wherein the reliability indicator and the reliability threshold comprise a minimum absolute value of a log-likelihood ratio (LLR) of each information bit returned by the decoding of the code block.

40. The apparatus of claim 31, wherein the at least one processor is further configured to skip an error check procedure on a decoded version of the transport block when the reliability indicator for all of the plurality of code blocks of the transport block indicate that the decoding is reliable.

* * * * *